United States Patent
Neystadt et al.

(10) Patent No.: US 11,516,257 B2
(45) Date of Patent: *Nov. 29, 2022

(54) DEVICE DISCOVERY FOR CLOUD-BASED NETWORK SECURITY GATEWAYS

(71) Applicant: Akamai Technologies, Inc., Cambridge, MA (US)

(72) Inventors: Eugene (John) Neystadt, Kfar-Saba (IL); Michael Graham, Weymouth, MA (US); John Devasia, Coppell, TX (US)

(73) Assignee: Akamai Technologies, Inc., Cambridge, MA (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/087,816

(22) Filed: Nov. 3, 2020

(65) Prior Publication Data
US 2021/0152604 A1    May 20, 2021

Related U.S. Application Data (63) Continuation of application No. 16/101,785, filed on Aug. 13, 2018, now Pat. No. 10,834,138.

(51) Int. Cl.
*H04L 9/40* (2022.01)
*G06F 21/55* (2013.01)
(Continued)

(52) U.S. Cl.
CPC ............ *H04L 63/20* (2013.01); *G06F 21/552* (2013.01); *H04L 12/66* (2013.01);
(Continued)

(58) Field of Classification Search
CPC ..... H04L 63/20; H04L 12/66; H04L 61/2585; H04L 63/0272; H04L 63/0281;
(Continued)

(56) References Cited

U.S. PATENT DOCUMENTS 6,820,133 B1 ‡ 11/2004 Grove ............... H04L 29/12066
709/23
6,907,525 B2 ‡ 6/2005 Pazi .................. H04L 29/12066
709/22

(Continued)

FOREIGN PATENT DOCUMENTS

WO    WO-2014001773 A1 ‡ 1/2014 ......... H04L 61/2514

OTHER PUBLICATIONS

ZScaler, Inc., How do I distribute the PAC file URL to my users? Downloaded on Nov. 19, 2018, 5 pages., https://help.zscaler.com/zia/how-do-i-distribute-pac-file-url-my-users.‡

(Continued)

*Primary Examiner* — Michael R Vaughan (57) ABSTRACT

Among other things, this document describes systems, methods and devices for discovering and identifying client devices that attempt to access out-of-policy network services via a secure web gateway (or other network security gateway) that lacks visibility into the client network actual IP space. This is a common problem with cloud hosted SWG services that enforce access policy from outside of a customer network (e.g., external to an enterprise network), due to network address translation at the interface between the customer network and the public Internet where the cloud-hosted SWG resides. The teachings hereof address this problem. In one embodiment, a cloud hosted SWG can redirect a client to a bouncer device inside the customer network; that bouncer device can capture the actual client IP address.

12 Claims, 3 Drawing Sheets

(51) Int. Cl.
    *H04L 12/66* (2006.01)
    *H04L 61/2585* (2022.01)
    *H04L 67/563* (2022.01)

(52) U.S. Cl.
    CPC ...... *H04L 61/2585* (2013.01); *H04L 63/0272* (2013.01); *H04L 63/0281* (2013.01); *H04L 63/10* (2013.01); *H04L 63/1416* (2013.01); *H04L 63/166* (2013.01); *H04L 67/563* (2022.05)

(58) Field of Classification Search
    CPC ... H04L 63/10; H04L 63/1416; H04L 63/166; H04L 67/2814; H04L 63/029; G06F 21/552
    See application file for complete search history.

(56) References Cited

U.S. PATENT DOCUMENTS

| | | | |
|---|---|---|---|
| 7,111,057 B1‡ | 9/2006 | Sherman | H04L 63/14 709/22 |
| 7,191,332 B1‡ | 3/2007 | Pankajakshan | H04L 63/0428 713/16 |
| 7,240,100 B1‡ | 7/2007 | Wein | H04L 63/08 709/21 |
| 7,274,658 B2 | 9/2007 | Bornstein | H04L 45/00 370/22 |
| 7,296,082 B2‡ | 11/2007 | Leighton | H04L 29/06 709/23 |
| 7,318,100 B2‡ | 1/2008 | Demmer | H04L 29/06 709/20 |
| 7,376,716 B2‡ | 5/2008 | Dilley | H04L 67/2842 709/21 |
| 7,472,178 B2‡ | 12/2008 | Lisiecki | H04L 67/1095 709/22 |
| 7,512,708 B2‡ | 3/2009 | Read | H04L 29/06027 709/24 |
| 7,533,164 B2‡ | 5/2009 | Volz | H04L 29/12066 709/22 |
| 7,660,296 B2‡ | 2/2010 | Fletcher | H04L 61/2567 370/35 |
| 7,694,127 B2‡ | 4/2010 | Adams | H04L 29/12009 713/15 |
| 7,954,144 B1‡ | 5/2011 | Ebrahimi | H04L 67/02 726/12 |
| 7,979,528 B2‡ | 7/2011 | Eisenberg | H04L 69/165 709/22 |
| 8,103,783 B2 | 1/2012 | Plamondon | |
| 8,214,635 B2‡ | 7/2012 | Wang | H04L 63/0464 713/15 |
| 8,499,344 B2‡ | 7/2013 | Read | H04L 61/2514 726/11 |
| 8,539,329 B2‡ | 9/2013 | Wilson | G06F 16/9535 715/20 |
| 8,607,323 B2‡ | 12/2013 | Yuan | H04L 63/0236 726/11 |
| 8,615,583 B2 | 12/2013 | Plamondon | |
| 8,627,477 B2‡ | 1/2014 | Chen | H04L 63/1416 726/24 |
| 8,694,642 B2‡ | 4/2014 | Dempsky | H04L 61/6013 709/22 |
| 8,819,188 B2 | 8/2014 | Blatherwick et al. | |
| 8,949,591 B2 | 2/2015 | Ovsiannikov | |
| 9,154,512 B2‡ | 10/2015 | Qu | H04L 29/12509 |
| 9,270,765 B2‡ | 2/2016 | Narayanaswamy | H04L 63/20 |
| 10,038,631 B1‡ | 7/2018 | Ellis | H04L 63/0815 |
| 10,079,854 B1 | 9/2018 | Scott et al. | |
| 10,404,755 B2 | 9/2019 | Narayanaswamy et al. | |
| 10,834,138 B2 | 11/2020 | Neystadt | |
| 10,880,266 B1 | 12/2020 | Shribman et al. | |
| 2002/0059622 A1‡ | 5/2002 | Grove | H04L 29/12113 725/91 |
| 2004/0006615 A1 | 1/2004 | Jackson | |
| 2006/0098645 A1‡ | 5/2006 | Walkin | H04L 63/123 370/38 |
| 2008/0320116 A1‡ | 12/2008 | Briggs | H04L 61/2528 709/221 |
| 2011/0173345 A1‡ | 7/2011 | Knox | H04L 69/08 709/24 |
| 2011/0238767 A1‡ | 9/2011 | Murphy | H04L 51/12 709/20 |
| 2012/0255019 A1‡ | 10/2012 | McNamee | H04L 63/1416 726/24 |
| 2014/0164447 A1‡ | 6/2014 | Tarafdar | G06F 16/182 707/82 |
| 2014/0310811 A1‡ | 10/2014 | Hentunen | H04L 61/305 726/23 |
| 2016/0036857 A1‡ | 2/2016 | Foxhoven | H04L 61/1511 726/1 |
| 2016/0072847 A1‡ | 3/2016 | Bremen | H04L 63/0236 726/1 |
| 2017/0223029 A1‡ | 8/2017 | Sharma | H04L 67/10 |
| 2017/0279803 A1‡ | 9/2017 | Desai | H04L 69/162 |
| 2020/0186500 A1‡ | 6/2020 | Neystadt | H04L 61/304 |

OTHER PUBLICATIONS

ZScaler, Inc., How do I use a custom PAC file to forward traffic to ZIA? Downloaded Nov. 19, 2018, 3 pages., Downloaded Nov. 19, 2018, 3 pages. https://help.zscaler.com/zia/how-do-i-use-custom-pac-file-forward-traffic- zia.‡
ZScaler, Inc., Best Practices for Writing PAC Files, downloaded on Nov. 19, 2018, 4 pages., https://help.zscaler.com/zia/best-practices-writing- pac-files.‡
ZScaler, Inc., What is a PAC file, downloaded on Nov. 19, 2018, 3 pages., https://help.zscaler.com/zia/what-pac-file.‡
ZScaler, Inc., Writing a PAC File, downloaded on Nov. 19, 2018, 5 pages., https://help.zscaler.com/zia/writing-pac-file.‡
ZScaler, Inc., How do I use default PAC files to forward traffic to ZIA, downloaded on Nov. 19, 2018, 2 pages., https://help.zscaler.com/zia/how- do-i-use-default-pac-fi les-forward-traffic-zia.‡
FindProxy for URL, Example PAC File, downloaded on Nov. 9, 2018, 3 pages., http://findproxyforurl.com/example-pac-file/.‡
ZScaler, Inc., About Hosted PAC Files, downloaded on Nov. 19, 2018, 3 pages., https://help.zscaler.com/zia/about-hosted-pac-files.‡
Wikipedia, Proxy auto-config, downloaded on Nov. 9, 2018, 4 pages., https://en.wikipedia.org/wiki/Proxy_auto-config.‡
U.S. Appl. No. 16/101,785, filed Aug. 13, 2018.‡
Introduction to PAC Files, Find Proxy for URL, downloaded on Nov. 9, 2018, 6 pages., http://findproxyforurl.com/pac-file-introduction/. ‡
Wikipedia, Radius, downloaded on Jul. 16, 2018, 18 pages. https://en.wikipedia.org/wiki/RADIUS.‡
Tibbetts, Tracking the source of an internal infection—Cisco Umbrella, downloaded on Jul. 16, 2018, 4 pages, https://support.umbrella.com/hc/en-us/articles/1 15005910046-Tracking-the-source-of-an-internal-infection.‡
Wikipedia, X-Forwarded-For, downloaded on Jul. 16, 2018, 5 pages. https://en.wikipedia.org/wiki/X-Forwarded-For.‡
Wikipedia, URL redirection, downloaded on Jul. 13, 2018, 12 pages. https://en.wikipedia.org/wiki/URL_redirection.‡
edgeblue.com, Blue Coat Reporter, downloaded on Jul. 16, 2018, 3 pages. http://www.edgeblue.com/.‡
McAfee, Web Gateway: Understanding NTLM and Windows Domain Membership, downloaded on Jul. 16, 2018, 22 pages. https://community.mcafee.com/t5/Documents/Web-Gateway-Understanding-NTLM-and-Windows-Domain-Membership/ta-p/553819.‡
Blue Coat, Complete Web Visibility and Control, Blue Coat Reporter, Datasheet, 2013, 3 pages.‡
Counterpart EU Patent Application 19191409.4, Response to European Search Report dated Aug. 19, 2020, 22 pages.‡
Office Action, for U.S. Appl. No. 16/211,372, dated May 27, 2020, 25 pages.
Office Action, dated Nov. 19, 2020 in U.S. Appl. No. 16/211,383, 17 pages.

(56) References Cited

OTHER PUBLICATIONS

Letter titled "Communication Under MPEP § 609.02" dated Nov. 3, 2020, submitted with this SB08 form.
U.S. Appl. No. 16/211,372, filed Dec. 6, 2018.
U.S. Appl. No. 16/211,383, filed Dec. 6, 2018.
Non-Final Rejection for U.S. Appl. No. 17/206,260, dated Aug. 2, 2022, 53 pages.

‡ imported from a related application

DEVICE DISCOVERY FOR CLOUD-BASED NETWORK SECURITY GATEWAYS

BACKGROUND

Technical Field

This application relates generally to network security and more particularly to the discovery and identification of a device contacting a secure web gateway hosted outside an enterprise network.

Brief Description of the Related Art

It is known in the art to provide a secure web gateway (SWG) to analyze client attempts to access websites or groups or websites. Typically a SWG is configured to block access to sites that represent a security threat or otherwise violate an acceptable use policy for an organization. For example, an enterprise can deploy a SWG and force computers on the enterprise network (e.g., employee computers) to traverse the SWG before egressing to the public Internet to block known malware sites or perform inline payload analysis and block downloads that contain malware.

SWGs are often deployed as an appliance residing in an enterprise network. More recently, however, cloud hosted SWGs have become popular. A cloud hosted SWG typically resides outside of the network which the SWG protects. A service provider operates the SWG as a service for the customer (e.g., the enterprise). The SWG typically sits on the public Internet; it may be anywhere in the world, although preferably the SWG servicing a given customer is located close (in network distance terms) to the customer Internet access point. In the cloud model, the customer arranges for its outbound traffic to leave the enterprise network and be directed to the SWG. This can be accomplished by request routing mechanisms, including via DNS lookups. Hence, requests from client devices in the enterprise network are directed to the SWG. The SWG examines this traffic and applies policy define by the enterprise, thereby determining whether the traffic should be blocked.

When the SWG blocks access for a user or device, the enterprise needs to discover and identify this device. This is because the enterprise needs to take remedial action, such as removing malware from the device or contacting the user, or otherwise administratively handling the policy violation.

To discover and identify the offending user and/or device, the SWG can capture the client IP address of the device performing the request. When the SWG is implemented as on-premises appliance, capturing the IP address is fairly straightforward. However, when the SWG is provided as a cloud-based service, the situation is more complicated. Typically a network address translation (NAT) router/firewall separates an enterprise or other client network from the SWG. A NAT hides IP address of all client devices, so that traffic originating from multiple client devices behind the NAT appears to the SWG as if it is sees arriving from same IP address.

As a result, the actual client IP address is hidden from SWG and it cannot be captured, and device can not be identified, when a client makes an HTTP request.

It is an object of this patent document to describe systems, methods and apparatus that enable the discovery and identification of a client device that contacts a cloud-hosted SWG, in order to solve the above-mentioned problems.

Those skilled in the art will understand these and other improvements from the teachings hereof.

BRIEF SUMMARY

Among other things, this document describes systems, methods and devices for discovering and identifying client devices that are attempting to access websites via a secure web gateway (SWG). The teachings hereof can be used with a cloud hosted SWG service that enforces access policy from outside of a client network (e.g., external to an enterprise or other organizational network). In such deployments, a NAT device typically sits at the interface between the client network and the public Internet, where the cloud-hosted SWG resides.

When a user attempts to access a web site that violates organizational policy, the NAT device typically hides the end-user client device's IP address from the cloud-hosted SWG. The SWG, which terminates the TLS connection as a trusted intermediary, redirects the user to a bouncer device deployed behind the NAT. The Bouncer captures the IP address. The Bouncer can show an error page or redirect the request further to an error page hosted in the Cloud SWG service.

The teachings hereof can be applied to cloud-hosted network security gateways and are not limited to web gateways using HTTP.

The teachings hereof can be used to improve the security of a computer networks by discovering and identifying client devices that violate policy as enforced by a cloud-hosted SWG, and thereby improve the performance and operation of computers, computer networks, and network infrastructure.

The foregoing is a description of certain aspects of the teachings hereof for purposes of illustration only; it is not a definition of the invention. The claims define the scope of protection that is sought, and are incorporated by reference into this brief summary. The claims are incorporated by reference into this section.

BRIEF DESCRIPTION OF THE DRAWINGS

The invention will be more fully understood from the following detailed description taken in conjunction with the accompanying drawings, in which.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different machines in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, HTTP versions 1.1 and 2, HTTP over QUIC, TCP/IP, and UDP, is assumed. The term "server" is used herein to refer to hardware (a computer configured as a server, also referred to as a "server machine") with server software running on such hardware (e.g., a web server). In addition, the term "origin" is used to refer to an origin server. Likewise, the terms "client" and "client device" is used herein to refer to hardware in combination with software (e.g., a browser or player application). While context may indicate the hardware or the software exclusively, should such distinction be appropriate, the teachings hereof can be implemented in any combination of hardware and software.

The term web page or "page" is meant to refer to a browser or other user-agent presentation defined by an HTML or other markup language document.

System Overview

Figure 1:
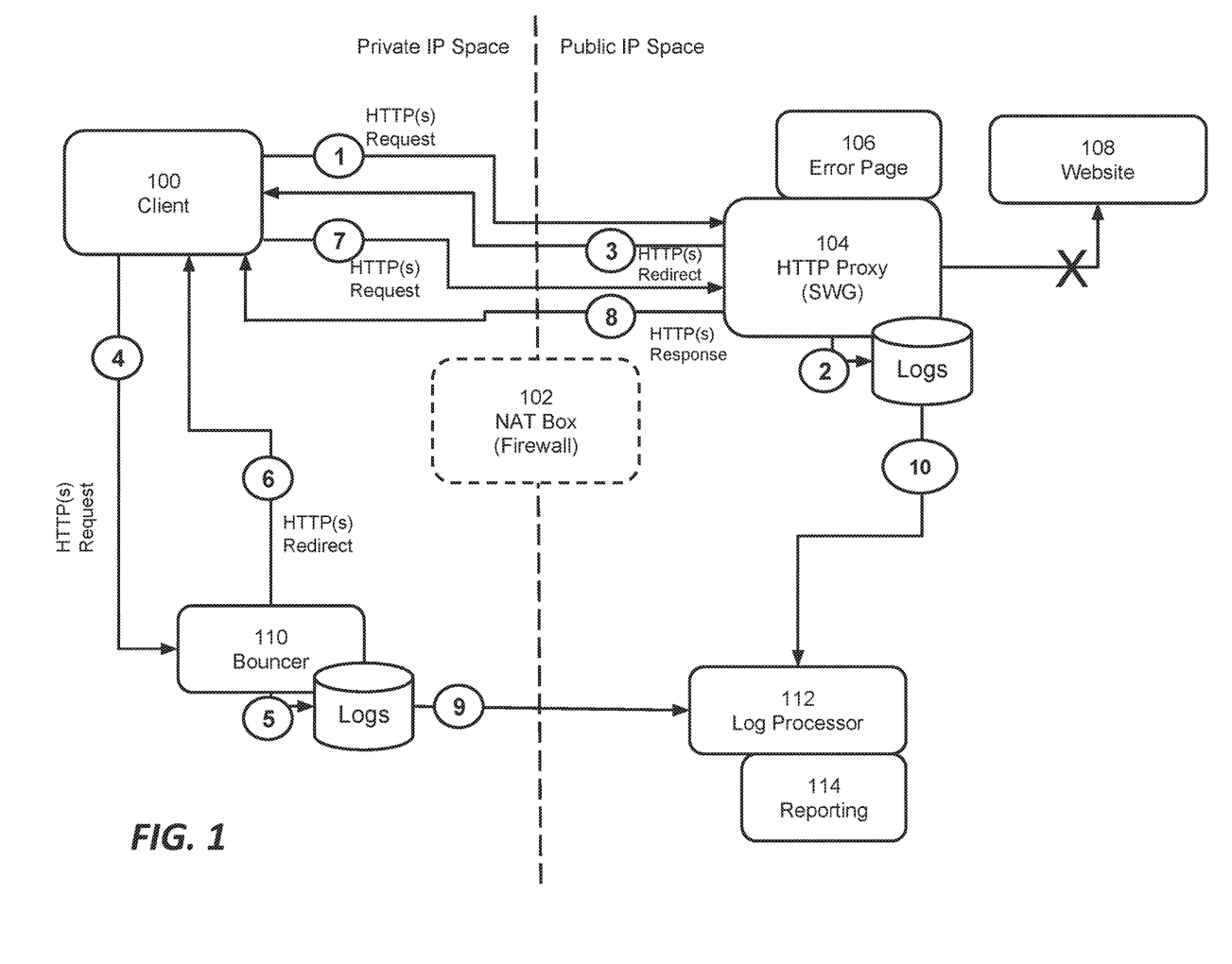
FIG. 1 is a diagram illustrating the flow of messages in a system according to one embodiment of the teachings hereof.

FIG. 1 is a block diagram of a system in accordance with one embodiment of the teachings hereof. Client 100 represents and end user client device running appropriate software, such as a browser or web-enabled app. The client 100 is connected to a network, such as a enterprise LAN (private IP space in FIG. 1), and is separated from the public Internet (public IP space) by a NAT box 102. Other network elements in the enterprise IP space, such as a routers, switches, or modems, are not depicted for convenience of illustration.

On the public IP side, a service provider deploys and operates a secure web gateway (SWG) 104. The SWG may be implemented as a HTTP proxy. Alternatively, the SWG 104 can be implemented without a CDN. The service provider operates the SWG 104 to inspect outbound HTTP traffic from the private IP space and apply access policy on behalf of the enterprise (or other organization) managing the private IP space. Along these lines, the SWG applies a policy for the enterprise to inspect and block access to websites that are a security threat, malicious, known to be associated with malware, containing objectionable content, or otherwise contrary to an acceptable use policy. The service provider may implement the SWG as a multi-tenant platform; each enterprise customer can configure its own policy to be applied to its corresponding traffic.

Also shown in FIG. 1 is a website 108, which is the website that the client 100 is attempting to reach. The website may be hosted on an origin server and the content of the website may be configured to be delivered by the CDN operating the SWG (if that embodiment is utilized).

The Bouncer 110 is a software and/or hardware/virtual machine entity deployed in the private IP space. Log processors 112 and Reporting 114 are typically asynchronous systems that collect, aggregate, and process log information from the indicated network elements to provide an administrator with analytical information about policy violations, and/or provide another system with such information for automated action/mitigation. This will be described in more detail below.

System Operation

In one embodiment, the system shown in FIG. 1 operates as follows, with reference to the circled steps (1) to (10) labeled in the diagram.

At step (1), the client 100 sends an HTTP request to access website 108. The request is routed through the NAT 102 to SWG 104. This request routing may be accomplished in a variety of ways. For example, the NAT 102 or other network element in the private IP space can encapsulate the outbound request with a packet addressed to the SWG 104. Preferably, however, DNS request routing is used. This means that the client looks up the hostname for the website 108 and is given an IP address (e.g, after a CNAME or otherwise) that points to the SWG 104. As a result, the client 100 connects to the SWG 104 to reach the hostname, preferably with a TLS-secured connection. The SWG 104 is preferably configured to provide a client-trusted certificate on behalf of the website 108 in order to decrypt and analyze the traffic between client 100 and the website 108. Hence, the SWG 104 operates as a trusted TLS Intermediary.

At (2), the SWG 104 generates a unique request identifier ("request-id"). The SWG 104 records in its logs the request-id, along with the URL of the website 108 that the client is attempting to access.

At (3), the SWG 104 sends an HTTP response redirecting the client 100 to the Bouncer 110, which is deployed in the same network as the client 100. This can be accomplished with a known HTTP code such as HTTP 302, 303 or 307. Preferably the redirect is labeled as a temporary redirect and not cached by the client 100, so that a subsequent request to the website 108 generates still goes to the SWG 104 initially and can be logged with a new request-id. For the redirect, the SWG 104 generates a URL with hostname pointing to the Bouncer 110 and carrying the same request-id (e.g., encoded in a pathname, URL parameter, or some other portion of the URL, other portion of the request). Alternatively, the redirect uses another indication to correlate the original request. The redirection can be done over HTTP or HTTPS. Unencrypted HTTP may be preferred in order to avoid the need for Bouncer 110 to also decrypt TLS traffic. This however possess a risk, since unauthorized parties could see contents of the request.

At (4), the client 100 sends an HTTP request to the Bouncer 110. The HTTP request carries the request-id or other indication of the original request from the SWG 104. The Bouncer 110 captures information about the client and logs this information with the request-id or other indication of original request. This step may include the Bouncer 110 performing any or all of the following substeps:

a. Extract [Client IP] from the connection over which HTTP or HTTPS request was received     b. Perform Reverse DNS Lookup in organizational DNS Server to acquire [Client Hostname]

c. Lookup [Client HostName] by [Client IP] in an organizational inventory, such as CMDB or LDAP server d. Collecting user login events from Authentication server, such as Active Directory and extracting [Username] to [Client IP] or [Client Hostname] mapping from these events.
e. Lookup user information in Radius server.
f. Perform online user authentication by accessing an organizational Authentication Server (not shown in FIG. 1), such as Active Directory, which may be not accessible otherwise to the SWG 104 using Kerberos, SAML or similar authentication protocols
g. Other means At (5), the Bouncer 110 records the request-id or other request correlator in the log database along with client information, e.g., [Client IP], [Client Hostname] and/or [Username].

At (6), the Bouncer 110 sends an HTTP/HTTPS response to the client 100. In one embodiment, the response is an error page for the user, preferably indicating that access was blocked and the reason. In another embodiment, the response is another redirect back to the SWG 104 with the same request-id encoded in the URL. The redirect can be to an error page 106 hosted by the SWG 104.

Assuming the first embodiment of step (6), the error page served by the Bouncer 110 could contain code (e.g., Javascript) causing the client beacon the request-id along with any other information to the SWG 104.

Assuming the second embodiment of step (6), then at step (7) the client 100 follows the redirect back to the SWG 104, issuing another HTTP or HTTPS request for the website 108 or for the error page 106. The SWG 104 records the request-id along with any other information desired, such as a policy violation and the fact that an error page was served. The redirect to website 108 should be performed only for HTTP GET requests to avoid breaking POSTed forms or file uploads.

In response to the HTTP or HTTPS request at (7), the SWG 104 returns an error page to the to the client 100 details on policy violation and why the request to the web site 108 was denied. This is step (8).

At steps (9) and (10), the logs events from the SWG 104, Error Page 106, and Bouncer 110 are collected by the Log Processor 112. The Log Processor 112 correlates the original client request (at (1)) and the log on the Bouncer 110 using request-id, timing, or other correlation technique. Preferably, the log records correlation is performed after a configurable [delay] to allow log records from Bouncer 110 and Error Page 106 to be collected.

It is possible that some Bouncer 110 log records will have no corresponding log record of the SWG 104. This could indicate that network scanning activity is being performed on internal networks (e.g., scanning by the client that contacts the Bouncer 110). The Log Processor 112 can flag client machines doing this scanning and generate special alerts for an Administrator to indicate this, via Reporting 114.

It is possible that SWG 104 log records will have no corresponding log record of Bouncer 110. This could indicate a particular web application of the client 100 does not follow HTTP redirects. This can also be alerted via Reporting 114.

The Reporting 114 component allows an enterprise administrator to inquire for list of HTTP requests denied by the policy and show a list of [client IPs], [client hostnames] or [usernames] that have attempted to violate the policy, so that administrator can take a technical or organizational action against them. In some cases, the Reporting 114 data feed of policy violations can be connected to an automated system that takes some remedial action automatically. The action could be, for example, disabling the client 100 access to the private network (quarantine), enforcing controls to block the client 100 from reaching outside the private IP space (i.e., blocking from command and control) or proactive alerting of the administrator, etc.

Use in Content Delivery Networks

As noted above, the teachings hereof may be implemented in a system in which the SWG 104, as a HTTP proxy, is in a server in a CDN.

A description of a conventional CDN is now provided. the SWG 104 may be implemented as a component of the CDN server 202 described below and shown in FIGS. 2-3.

A CDN is a distributed computer system and it can be (but does not have to be) operated and managed by a service provider. A "distributed system" of this type typically refers to a collection of autonomous computers linked by a network or networks, together with the software, systems, protocols and techniques designed to facilitate various services, such as content delivery or the support of site infrastructure. The infrastructure can be shared by multiple tenants, typically referred to as the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence. The CDN processes may be located at nodes that are publicly-routable on the Internet, within or adjacent to nodes that are located in mobile networks, in or adjacent to enterprise-based private networks, or in any combination thereof.

Figure 2:
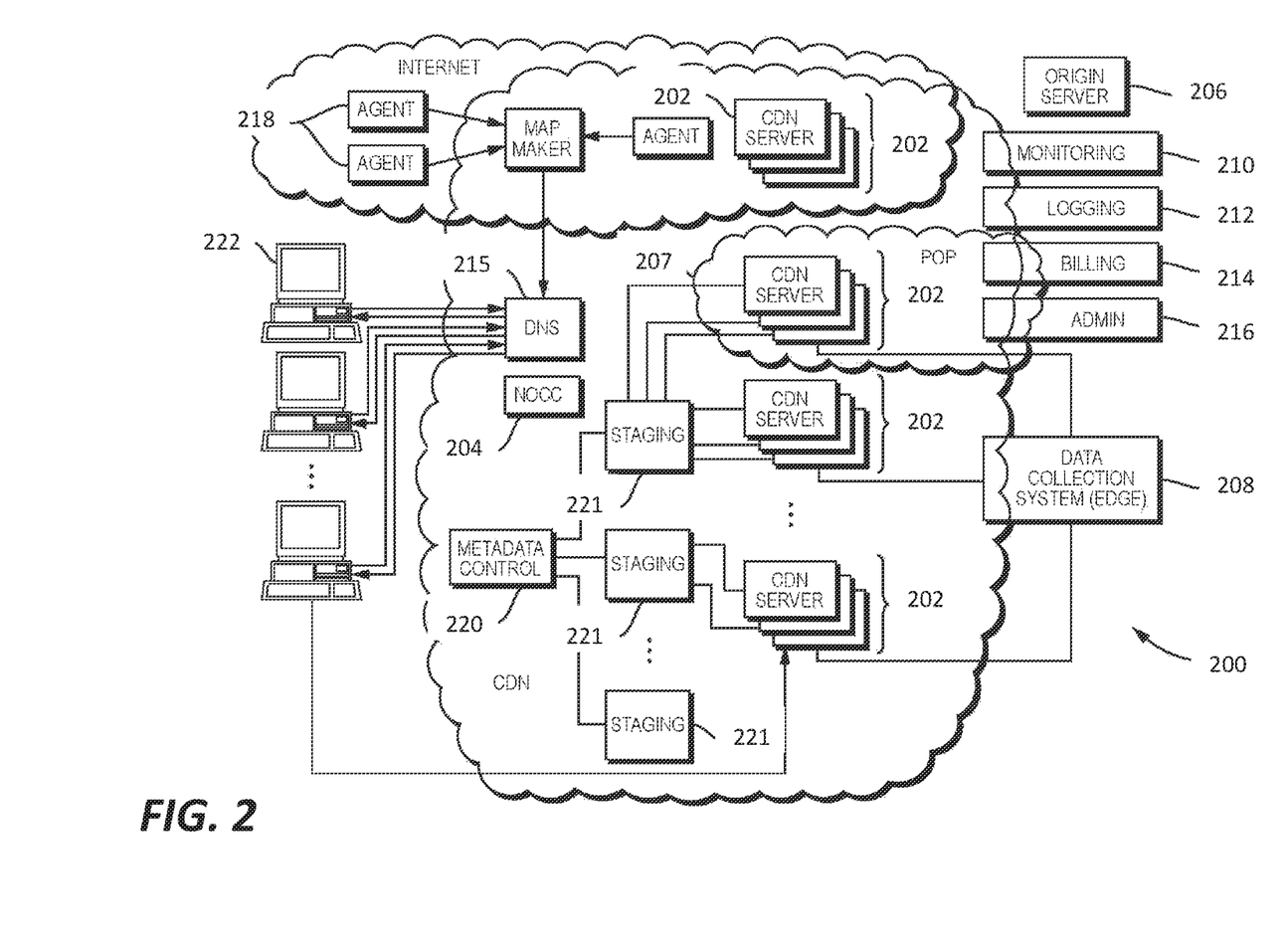
FIG. 2 is a high-level diagram of an embodiment of the content delivery network (CDN) in which the teachings hereof may be implemented; and, FIG. 3 is a block diagram illustrating hardware in a computer system that may be used to implement the teachings hereof.

In a known system such as that shown in FIG. 2, a distributed computer system 200 is configured as a content delivery network (CDN) and is assumed to have a set of machines 202 distributed around the Internet. The machines 202 are servers and can be the network cache mentioned in this document. Typically, most of the machines are configured as servers and located near the edge of the Internet, i.e., at or adjacent end user access networks. A network operations command center (NOCC) 204 may be used to administer and manage operations of the various machines in the system. Third party sites affiliated with content providers, such as web site 206, offload delivery of content (e.g., HTML or other markup language files, embedded page objects, streaming media, software downloads, and the like) to the distributed computer system 200 and, in particular, to the servers 202 (which are sometimes referred to as content servers, or sometimes as "edge" servers in light of the possibility that they are near an "edge" of the Internet). Such servers may be grouped together into a point of presence (POP) 207.

Typically, content providers offload their content delivery by aliasing (e.g., by a DNS CNAME) given content provider domains or sub-domains to domains that are managed by the service provider's authoritative domain name service. End user client machines 222 that desire such content may be directed to the distributed computer system to obtain that content more reliably and efficiently. The CDN servers respond to the client requests, for example by obtaining requested content from a local cache, from another CDN server, from the origin server 106, or other source.

Although not shown in detail in FIG. 2, the distributed computer system may also include other infrastructure, such as a distributed data collection system 208 that collects usage and other data from the CDN servers, aggregates that data across a region or set of regions, and passes that data to other back-end systems 210, 212, 214 and 216 to facilitate monitoring, logging, alerts, billing, management and other operational and administrative functions. Distributed network agents 218 monitor the network as well as the server loads and provide network, traffic and load data to a DNS query handling mechanism 215, which is authoritative for content domains being managed by the CDN. A distributed data transport mechanism 220 may be used to distribute control information (e.g., metadata to manage content, to facilitate load balancing, and the like) to the CDN servers.

A given machine in the CDN comprises commodity hardware (e.g., a microprocessor) running an operating system kernel (such as Linux® or variant) that supports one or more applications. To facilitate content delivery services, for example, given machines typically run a set of applications, such as an HTTP proxy, a name server, a local monitoring process, a distributed data collection process, and the like. The HTTP proxy typically includes a manager process for managing a cache and delivery of content from the machine. For streaming media, the machine typically includes one or more media servers, as required by the supported media formats.

A given CDN server 202 may be configured to provide one or more extended content delivery features, preferably on a domain-specific, content-provider-specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN.

In a typical operation, a content provider identifies a content provider domain or sub-domain that it desires to have served by the CDN. The CDN service provider associates (e.g., via a canonical name, or CNAME, or other aliasing technique) the content provider domain with a CDN hostname, and the CDN provider then provides that CDN hostname to the content provider. When a DNS query to the content provider domain or sub-domain is received at the content provider's domain name servers, those servers respond by returning the CDN hostname. That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server associated with the IP address. The request includes a Host header that includes the original content provider domain or sub-domain. Upon receipt of the request with the Host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as described previously. Thus, the domain name or subdomain name in the request is bound to (associated with) a particular configuration file, which contains the rules, settings, etc., that the CDN server should use for that request.

As an overlay, the CDN resources may be used to facilitate wide area network (WAN) acceleration services between enterprise data centers (which may be privately managed) and to/from third party software-as-a-service (SaaS) providers.

CDN customers may subscribe to a "behind the firewall" managed service product to accelerate Intranet web applications that are hosted behind the customer's enterprise firewall, as well as to accelerate web applications that bridge between their users behind the firewall to an application hosted in the internet cloud (e.g., from a SaaS provider). To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end.

The CDN may have a variety of other features and adjunct components. For example the CDN may include a network storage subsystem (sometimes referred to herein as "NetStorage") which may be located in a network datacenter accessible to the CDN servers, such as described in U.S. Pat. No. 7,472,178, the disclosure of which is incorporated herein by reference. The CDN may operate a server cache hierarchy to provide intermediate caching of customer content; one such cache hierarchy subsystem is described in U.S. Pat. No. 7,376,716, the disclosure of which is incorporated herein by reference. Communications between CDN servers and/or across the overlay may be enhanced or improved using techniques such as described in U.S. Pat. Nos. 6,820,133, 7,274,658, 7,660,296, the disclosures of which are incorporated herein by reference.

For live streaming delivery, the CDN may include a live delivery subsystem, such as described in U.S. Pat. No. 7,296,082, and U.S. Publication No. 2011/0173345, the disclosures of which are incorporated herein by reference.

Computer Based Implementation

The teachings hereof may be implemented using conventional computer systems, but modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 3:
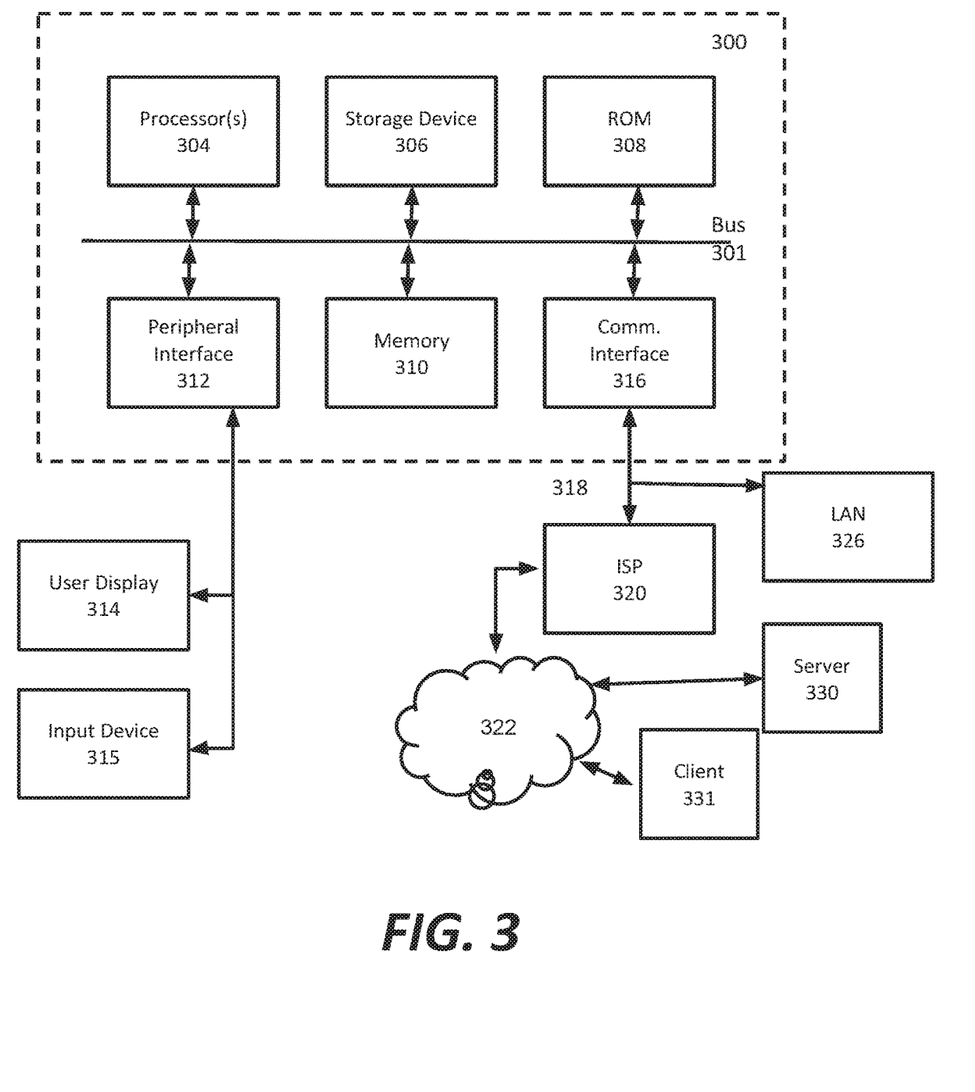

FIG. 3 is a block diagram that illustrates hardware in a computer system 300 upon which such software may run in order to implement embodiments of the invention. The computer system 300 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 300 includes a microprocessor 304 coupled to bus 301. In some systems, multiple processor and/or processor cores may be employed. Computer system 300 further includes a main memory 310, such as a random access memory (RAM) or other storage device, coupled to the bus 301 for storing information and instructions to be executed by processor 304. A read only memory (ROM) 308 is coupled to the bus 301 for storing information and instructions for processor 304. A non-volatile storage device 306, such as a magnetic disk, solid state memory (e.g., flash memory), or optical disk, is provided and coupled to bus 301 for storing information and instructions. Other application-specific integrated circuits (ASICs), field programmable gate arrays (FPGAs) or circuitry may be included in the computer system 300 to perform functions described herein.

A peripheral interface 312 communicatively couples computer system 300 to a user display 314 that displays the output of software executing on the computer system, and an input device 315 (e.g., a keyboard, mouse, trackpad, touchscreen) that communicates user input and instructions to the computer system 300. The peripheral interface 312 may include interface circuitry, control and/or level-shifting logic for local buses such as RS-485, Universal Serial Bus (USB), IEEE 1394, or other communication links.

Computer system 300 is coupled to a communication interface 316 that provides a link (e.g., at a physical layer, data link layer,) between the system bus 301 and an external communication link. The communication interface 316 provides a network link 318. The communication interface 316 may represent a Ethernet or other network interface card (NIC), a wireless interface, modem, an optical interface, or other kind of input/output interface.

Network link 318 provides data communication through one or more networks to other devices. Such devices include other computer systems that are part of a local area network (LAN) 326. Furthermore, the network link 318 provides a link, via an internet service provider (ISP) 320, to the Internet 322. In turn, the Internet 322 may provide a link to other computing systems such as a remote server 330 and/or a remote client 331. Network link 318 and such networks may transmit data using packet-switched, circuit-switched, or other data-transmission approaches.

In operation, the computer system 300 may implement the functionality described herein as a result of the processor executing code. Such code may be read from or stored on a non-transitory computer-readable medium, such as memory 310, ROM 308, or storage device 306. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 318 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method for identifying client devices in a private network that violate a policy for accessing websites outside the private network, comprising:

A. at a network security gateway in a public network:
receiving an attempt to access a website from a client in a private network, the client's IP address being hidden from the network security gateway due to a network address translation (NAT) device that separates the private network from the public network and changes the client's IP address as packets traverse the NAT device from the private network to the public network;
applying a policy to the attempt to access the website, the policy defined by an administrator of the private network and relating to any of security threats and acceptable use policies for the private network;
generating an identifier for the attempt to access the website;
based on determining that the attempt to access the website violates the policy, redirecting the client to a bouncer component in the private network;
logging the identifier and sending a record with the identifier to a log processor and reporting component;

B. at the log processor and reporting component;
receiving the record from the network security gateway;

receiving a record from the bouncer component, comprising the identifier and client information associated with the client;

matching the record from the network security gateway with the record from the bouncer component; and, reporting the client information to enable remedial action against the client by at least one of:
- an administrator of the private network, and
- an automated system for taking action against the client in the private network.

2. The method of claim 1, where the remedial action is taken by the automated system.

3. The method of claim 2, wherein the action is at least one of: quarantining the client by disabling access to the private network, and enforcing a control to block the client from reaching outside an IP space of the private network.

4. The method of claim 1, wherein the client information associated with the client comprises any of: IP address, hostname, client username.

5. The method of claim 1, further comprising: the bouncer component capturing the client information associated with the client.

6. The method of claim 5, the bouncer component capturing the client information associated with the client by performing at least one of the following:
  (i) extracting client IP address from a connection with the client;
  (ii) performing a reverse DNS lookup in an organizational DNS server to acquire a client hostname;
  (iii) looking up client hostname by client IP address in an organizational inventory;
  (iv) collecting user login events from an authentication server;
  (v) looking up user information in Radius server; and,
  (vi) performing online user authentication by accessing an organizational authentication server not accessible to the network security gateway.

7. A system for identifying client devices in a private network that violate a policy for accessing websites outside the private network, comprising:
  A. a network security gateway in a public network, the network security gateway comprising at least one hardware processor and memory holding instructions for execution on the at least one processor to cause, upon execution, the network security gateway to:
    receive an attempt to access a website from a client in a private network, the client's IP address being hidden from the network security gateway due to a network address translation (NAT) device that separates the private network from the public network and changes the client's IP address as packets traverse the NAT device from the private network to the public network;
    apply a policy to the attempt to access the website, the policy defined by an administrator of the private network and relating to any of security threats and acceptable use policies for the private network;
    generate an identifier for the attempt to access the website;
    based on determining that the attempt to access the website violates the policy, redirect the client to a bouncer component in the private network;
    log the identifier and sending a record with the identifier to a log processor and reporting component;
  B. the log processor and reporting component comprising at least one hardware processor and memory holding instructions for execution on the at least one processor to cause, upon execution, the log processor and reporting component to:
    receive the record from the network security gateway;
    receive a record from the bouncer component, comprising the identifier and client information associated with the client;
    match the record from the network security gateway with the record from the bouncer component; and,
    report the client information to enable remedial action against the client by at least one of:
    - an administrator of the private network, and
    - an automated system for taking action against the client in the private network.

8. The system of claim 7, where the remedial action is taken by the automated system.

9. The system of claim 8, wherein the action is at least one of: quarantine the client by disabling access to the private network, and enforce a control to block the client from reaching outside an IP space of the private network.

10. The system of claim 7, wherein the client information associated with the client comprises any of: IP address, hostname, client username.

11. The system of claim 7, wherein:
  the bouncer component comprises at least one hardware processor and memory holding instructions for execution on the at least one processor to cause, upon execution, the log processor and reporting component to:
    capture the client information associated with the client.

12. The system of claim 11, wherein the capture of the client information associated with the client occurs by performing at least one of the following:
  (i) extract client IP address from a connection with the client;
  (ii) perform a reverse DNS lookup in an organizational DNS server to acquire a client hostname;
  (iii) look up client hostname by client IP address in an organizational inventory;
  (iv) collect user login events from an authentication server;
  (v) look up user information in Radius server; and,
  (vi) perform online user authentication by accessing an organizational authentication server not accessible to the network security gateway.

* * * * *